March 2, 1954
C. F. HUTTMANN
2,670,835
CONVEYER SYSTEM
Filed March 22, 1952
2 Sheets-Sheet 1
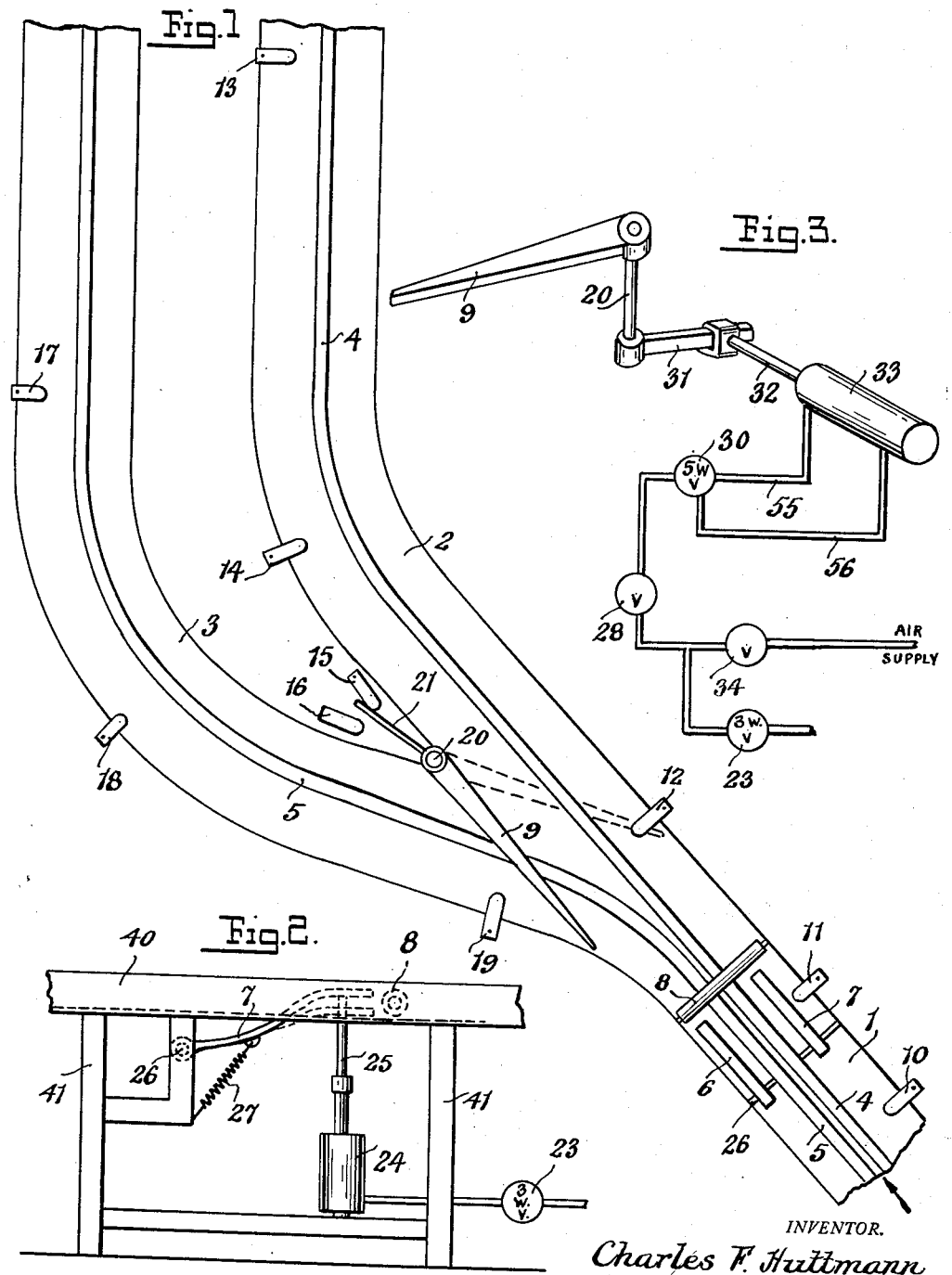
INVENTOR.
Charles F. Huttmann
BY Fritz Ziegler
ATTORNEY

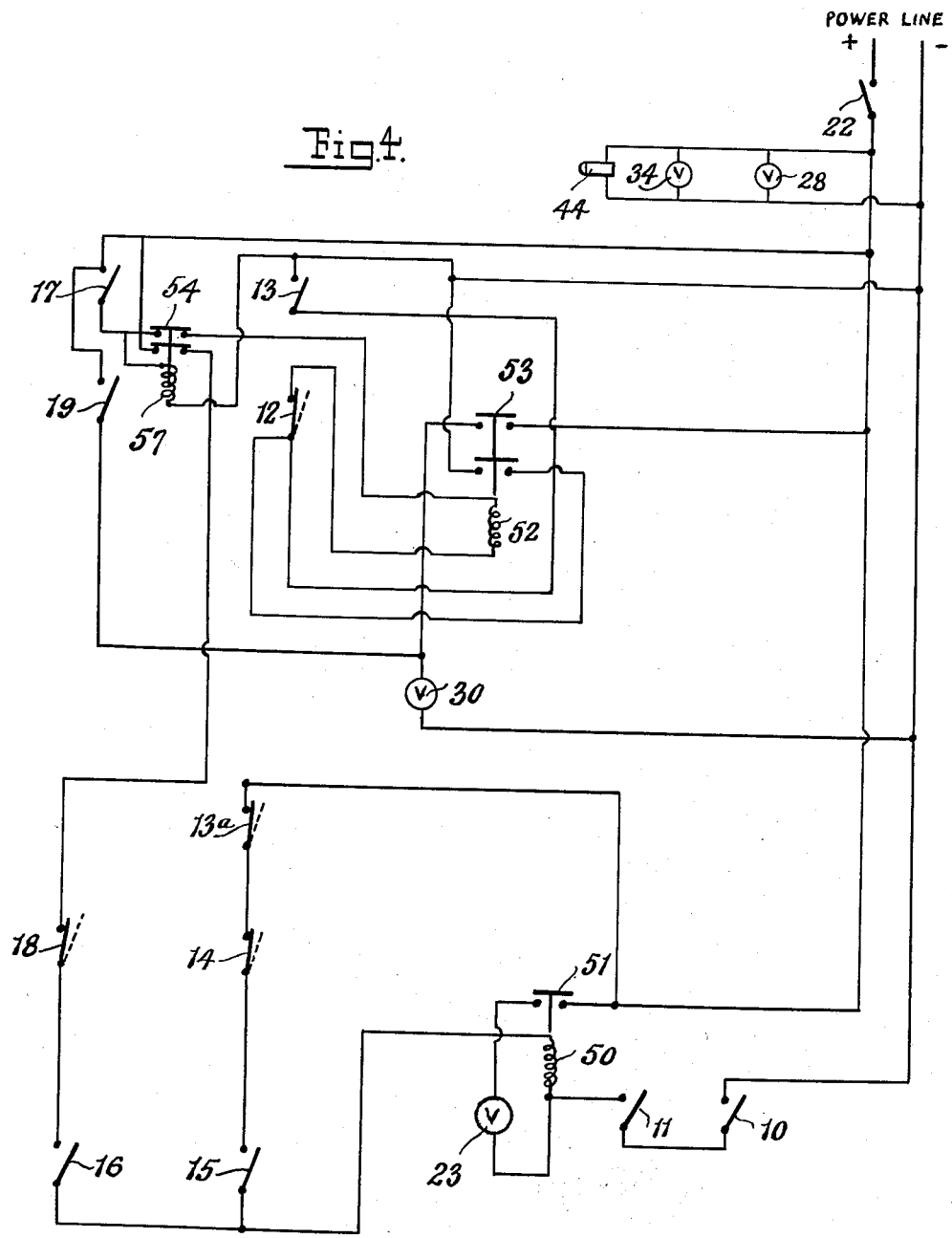

Patented Mar. 2, 1954

2,670,835

UNITED STATES PATENT OFFICE 2,670,835

CONVEYER SYSTEM

Charles F. Huttmann, Bethpage, N. Y.

Application March 22, 1952, Serial No. 278,045

8 Claims. (Cl. 198—31)

1

This invention relates to conveyor systems and more particularly to those of the type in which packages or other articles can be conveyed in groups of predetermined number from an established starting point to points of discharge from the conveyor.

The invention has for one of its objects the provision of an improved conveying means by which an automatic disposition of the packages in groups of selected number will be had in established channels; by which a control of the system to prevent clogging or jamming will be had, and with which numerous other advantages will be attained.

With these and other objects to be hereinafter set forth, I have devised the particular arrangement of elements to be described in the following specification and claims appended hereto.

In the accompanying drawings, wherein an illustrative embodiment of the invention is disclosed, Fig. 1 is a diagrammatic view of the improved conveyor system;

Fig. 2 is a side elevation of a part of the conveyor, showing the lifting means and the mechanism for elevating the same;

Fig. 3 is a schematic view showing the diverter arm and the means which actuates the same; and Fig. 4 shows the electrical circuit.

Referring to the drawing, 1 indicates the main branch or part of the conveyor, or that portion thereof which is located near the starting point of the system. The conveyor includes a frame, a portion of which is shown in Fig. 2, and which includes parallel longitudinal rails one of which is shown at 40 extending for the length of the system, and supported at the required height by the spaced legs 41. Movable between the rails 40 are the conveyor elements 4 and 5, which can be movable chains or conveyor belts, or other suitable movable means by which packages, boxes or other articles to be conveyed are moved along.

The conveyor is shown as provided with the two branches or channels indicated respectively at 2 and 3, and in the operation of the system, the packages on the conveyor are caused to be delivered in a group of a predetermined number of the packages to one of the channels and then delivered in a group of a predetermined number of packages to the second channel and so on. The number of packages in each group need not be the same for one channel as it is for the other channel.

The two belts or chains 4 and 5 are operated at the same speed and these belts or chains op-

2 erate in parallelism and in close proximity in tne part 1 of the system, and then separate, as clearly seen in Fig. 1, so that the belt or chain 4 carries packages along through the channel 2, while the belt or chain 5 carries packages along through the channel 3.

Adjacent to the point of beginning of the two channels 2 and 3, is an abutment or stop in the form of a roller 8 extending transversely of the conveyor, and in position to prevent packages from passing it unless an elevating means is in position to cause the packages to ride over the top of the roller 8. Such elevating means consists of a pair of lifter arms 6 and 7 which are pivoted at one end as indicated at 26 in Fig. 2. These lifter arms 6 and 7 are normally held in lowered position by means of springs 27, and when held in such position, packages moved along the conveyor in the direction of the arrow shown in Fig. 1, will be halted by the roller 8. At the required times, the lifter arms 6 and 7 will be elevated by means of a piston rod 25 of an air cylinder 24, and when the lifter arms 6 and 7 are in such elevated position, the packages will ride on these arms and be caused to move over the roller 8 and proceed into one or the other of the channels 2 and 3, according to the position of a diverter arm 9, the operation of which will be presently described.

The electrical circuit for controlling the operation of the improved conveying system is shown in Fig. 4, wherein it will be noted that the main switch is shown at 22 and while the same is open, the conveyor belts or chains 4 and 5 may be in motion and proceeding in the direction of the arrow in Fig. 1. At this time, the lifter arms 6 and 7 are in their lowered position so that no package will pass the roller 8. The main switch 22 is then closed, and this energizes the control system, including solenoid valves indicated at 28 and 34 and causes the indicator light 44 to glow. The solenoid valve 34 is a normally-closed valve and when it is energized it allows air to pass to the solenoid valves indicated respectively at 30 and 23. The valve 30 is a five-way valve which controls the flow of air to the opposite sides of a piston in an air cylinder 33. This cylinder 33 has its piston rod 32 connected to the arm 31 of the diverter bar 9, which bar 9 is pivoted at 29 at the junction of the two branches or channels 2 and 3 of the conveyor as seen in Fig. 1. By the operation of this air cylinder 33 the diverter arm may be swung on its pivot 29 to assume a position, as shown in full lines of Fig. 1 by which it blocks the channel 3, or it may be swung to the position shown in dotted lines, wherein it blocks channel 2 and causes the packages to be diverted into channel 3. The solenoid valve 23 is a three-way valve controlling the delivery of air into the cylinder 24 by means of which the lifter arms 6 and 7 are elevated as required.

The valve 28 is a normally-open valve used as a safety release. When said valve 28 is energized it closes and allows the air pressure to enter cylinder 33 and move the diverter arm 9. When valve 28 is de-energized it opens, allowing the air to escape from the cylinder 33 so that the diverter arm will not be moved, although at this time the diverter arm can be manually shifted if desired.

Located along the side rails of the conveying system is a plurality of switches indicated respectively at 10, 11, 12, 13, 14, 17, 18 and 19. All of these switches are arranged with their operating element so disposed in the path of packages moving along on the conveyor that the packages will contact such operating element and cause opening or closing of each switch as required and as hereafter pointed out.

When the main switch 22 is closed, the diverter arm 9 moves to the position shown in full lines in Fig. 1, in which it is blocking channel 3 and as long as it remains in this position will cause direction of the packages from the main portion 1 of the conveyor into the channel 2. This is the initial position of the diverter arm 9 and when it reaches that position, a switch 15 which is normally open, is closed by the tail arm 21 of the diverter arm, and a circuit is thereupon completed through the switches 14, 13, 11 and 19, energizing the coil 50 of the relay 51 which makes a circuit through the solenoid valve 23. This causes a flow of air pressure through cylinder 24 with resultant lifting of the piston rod 25, to thereby elevate the lifter arms 6 and 7 and retain the same in such elevated position. In the meantime, packages have become lined up behind the roller 8 and when the lifter bars 6 and 7 are elevated as above described, the packages will begin to pass over the roller and move along into the channel 2 of the conveyor. The packages lined up in front of the roller 8 and those which follow, maintain the switches 10 and 11 in closed condition. It will be understood that if no packages are at the switch 10 or 11, the switch at which a package is absent will remain open and consequently the lifter arms 6 and 7 will not be elevated.

When the lifter arms 6 and 7 are elevated as above described, the packages will pass over the roller 8, and with the diverter arm 9 in the position shown in full lines in Fig. 1, the packages will move into and pass along in the channel 2. As the packages move along in channel 2 they first come into contact with switch 12 which acts as a lock to cause the diverter arm 9 to remain in the position shown in Fig. 1. The switch 12 is a normally-closed switch and is in series with a coil 52 of a relay 53, which relay controls the flow of current to the solenoid valve 30. If no current is fed to the valve 30, the diverter arm 9 will remain in the position shown, in which it blocks the channel 3 of the conveyor. When switch 12 is opened, it is not possible to make a circuit through the coil 52, and hence the diverter arm 9 is locked in the position shown.

After passing the switch 12, the packages next open the switch 14 which is normally closed and is in series with the coil 50 of relay 51. When switch 14 is opened, the current ceases to flow to valve 23 and as a result, the flow of air under pressure to the cylinder 24 ceases, and the springs 27 will cause descent of the lifter arms 6 and 7. The flow of packages into the channel 2 is now interrupted since those packages which are behind the roller 8 can no longer move over the roller. The switch 14 is adjustable along the length of the side rail 40 of the conveyor on which it is mounted, and its distance from the roller 8 determines the number of packages permitted to move into the channel 2 before the lifter bars are lowered to prevent additional packages from being directed into that channel. The first package in the line of packages that is now in channel 2 next comes into contact with switch 13 which includes in addition to a normally open set of contacts, a normally closed set indicated at 13a. As will be seen in the lower part of the diagram shown in Fig. 4, the normally closed set of contacts, designated at 13a, is in a series circuit with switch 14 which assures the non-elevation of the lifter bars 6 and 7. This switch 13 is also adjustable along the length of the side rail of the conveyor, and the distance between the switch 13 and the switch 14 is equal to the distance from the roller 8 to the pivot point 20 of the diverter arm 9. This guarantees that no package shall be in the conveyor line between the pivot point 20 and the roller 8 when the diverter arm 9 is swung from the position shown in full lines to that shown in dotted lines, in which the arm blocks the entrance to the channel 2. The set of normally-open contacts of switch 13, and shown in the upper portion of the diagram of Fig. 4, when closed will cause a circuit to be made through the coil 52 of the relay 53.

When the circuit is completed through the coil 52, the two sets of the normally-open contacts in the relay 53 are closed. One set of these contacts acts as a holding circuit through one set of normally-closed contacts of a relay 54 and the switch 12. The second set of normally-open contacts in the relay 53 completes a circuit to the solenoid valve 30 which causes air to leave one side of the cylinder 33 through piping 55 and air to enter into the other side of the cylinder through piping 56, and cause the piston rod 32 to swing the diverter arm 9 from the position shown in full lines to that shown in dotted lines in Fig. 1. As the diverter arm reaches the latter position, its tail arm 21 will be swung to a position to close switch 16, which is a normally-open switch in series with normally-closed switch 18, and with the second set of normally-closed contacts of the relay 54 and the coil 57 thereof. When the switch 16 is closed, the air under pressure is again delivered to the cylinder 24, which raises the lifter bars 6 and 7, allowing packages behind the roller 8 to pass over the roller. Since the diverter arm 9 is now blocking the channel 2, the packages will then flow into the channel 3. As the packages move along in channel 3 they first come into contact with the switch 19 which acts as a lock for the diverter arm 9, as explained with relation to the switch 12, and the diverter arm will be held for a predetermined time in the dotted line position of Fig. 1.

Switch 19 is a normally-open switch and when it is closed by the packages as above described, it completes a circuit from the positive side of the line through the coil of the solenoid valve 30 to the negative side of the line. The switch 19 controls all other circuits which control the movements of the diverter arm 9.

As the packages continue to move along in channel 3, they next contact with switch 18, which is a normally-closed switch, and is in series with the coil 50 of the relay 51. This causes air to be released from the cylinder 24 and the lifter bars 6 and 7 to descend and thereby prevent the passage of additional packages past the roller 8. Since the switch 18 is adjustable along the length of the side rail of the conveyor frame, the distance at which it is located from the roller 8 determines the number of packages that pass at one time into the channel 3. The switch 17, which the packages moving in channel 3 pass, is a normally-open switch and is in series with the coil 57 of the relay 54, and as a result when the switch 17 is closed, this places the coil 57 across the line, causing the two sets of normally closed contacts in the relay 54 to open. One set of these normally-closed contacts of the relay is in series with the switches 18 and 16 and the coil 50 of the relay 51. If this set of contacts is open, no packages can pass the roller 8 for the lifter arms 6 and 7 will then be in lowered position. When the second set of normally-closed contacts of the relay 54 is held open, the holding circuit for the relay 53 is prevented from working and this causes the relay 53 to drop out and the circuit through the second set of contacts of the relay 53 to be broken, and which circuit was causing the passage of air to flow to the coil of solenoid valve 30 which caused air to flow to the cylinder 33 holding the diverter arm 9 at the dotted line position. The arm 9 is now swung to the full line position to block channel 3 and the flow of packages into the channel 2 is again started. Switch 17 is adjustable along the length of the side rail of the conveyor frame, and the distance between it and switch 18 is equal to the distance between the roller 8 and the pivot 20 of the diverter arm 9.

If for any reason, the flow of packages is halted beyond switch 13 while packages are moving in the channel 2, the packages will build up to switch 13. Such packages then operative upon switch 13, will result in the normally-closed contacts 13a of switch 13 being held open. Since these contacts 13a are in series with relay 51 controlling the flow of air to the cylinder 24, no air will flow to said cylinder and the lifter arms 6 and 7 will remain in lowered position, and therefore no additional packages will pass into the channel 2. At the same time, the normally-open contacts of the switch 13 will close and circuit is made through coil 52, which in turn makes the circuits as heretofore described, to move the diverter arm from the full line position of Fig. 1 to that shown in dotted lines.

If for some reason the flow of packages along the channel 3 is stopped, beyond the switch 17, the packages will build up until switch 17 is reached which, when actuated will break the circuit through relay 54, allowing the lifter arms 6 and 7 to descend to thereby halt the flow of packages past roller 8, while the diverter arm 9 returns to its initial position. If both the channel 2 and the channel 3 remain filled back to their respective switches 17 and 13, no packages will be permitted to flow past the roller 8 since the lifter bars will remain in lowered position. Whichever line of packages moves past the switch 17 or 13, the diverter arm will move to the proper position and the packages will flow into that line.

From the foregoing, it will be apparent that the operation of the improved conveyor system is automatic and that groups of packages in selected numbers will be alternateley directed into the respective channels, with the possibility of jamming or blocking being prevented by the means herein described.

Having described one embodiment of the invention, it is obvious that the same is not to be restricted thereto, but is broad enough to cover all structures coming within the scope of the annexed claims.

What I claim is:

1. In a conveyor system, a conveyor having a junction from which a plurality of branch conveyors extend, a movable diverter arm at said junction, electrically-controlled means for moving said diverter arm to cause it to block the passage of packages into either of the branch conveyors, an abutment on the conveyor located adjacent to the junction, package-elevating means adjacent to the abutment, electrically-controlled means for raising the package-elevating means to thereby cause said means to direct packages over the abutment, switch means for controlling the operation of said package-elevating means whereby said package-elevating means will be lowered after a predetermined number of packages has been moved into a branch of the conveyor, and switch means in said branch conveyors for causing movement of the diverter arm to a position to block said branch of the conveyor after said predetermined number of packages has entered said branch conveyors and has moved out of the path of movement of the diverter arm therein.

2. In a conveyor system, a main conveyor with a pair of channel conveyors leading from it, a movable diverter arm at the junction of the channel conveyors and the main branch, electrically-controlled means for swinging the diverter arm to cause it to be moved to a position to block one or the other of the channel conveyors, a roller forming an abutment and located between the main conveyor and the channel conveyors, package-lifting means in the main conveyor adjacent to the roller, electrically-controlled pneumatic means for elevating the package-lifting means, a switch for preventing raising of the elevating means unless packages are located in the main conveyor adjacent to the roller, a switch in each branch conveyor actuated by the packages as the packages pass along in said branch conveyor, said switch causing descent of the package-lifting means when a predetermined number of the packages has entered the branch conveyor in which said switch is located, and a switch in each branch conveyor for causing operation of the diverter arm to cause said arm to block the branch conveyor in which said switch is located when said switch is actuated by the passage of packages.

3. In a conveyor system, a pair of branch conveyors, a stop, means for elevating packages to cause the same to pass over the stop and enter into one or the other of the branch conveyors, a diverter determining by its position which branch shall receive the packages, means on the branch conveyors receiving the packages for determining the number of packages to be received in said branch conveyors and then rendering the elevating means inoperative, and means in the same branch conveyors for causing a change in position of the diverter after a predetermined number of packages has been received in said branch conveyors.

4. In a conveyor system as provided for in claim 3, including means for causing operation of the diverter only when all packages in either branch conveyor are out of the path of movement required by the diverter to move from one branch conveyor-blocking position to another branch conveyor-blocking position.

5. In a conveyor system, means for transporting packages, a blocking device for halting the movement of packages by said means, means adjacent to said blocking device for elevating packages to cause said packages to be moved over the blocking device, the system being provided with a plurality of branch conveyors meeting in a junction beyond the blocking device, a pivoted diverter arm at said junction adapted to be swung to close either of the branch conveyors, an electrical circuit for controlling the elevating means, a switch in each conveyor branch incorporated into said circuit for causing lowering of the elevating means after a predetermined number of packages has passed into a conveyor branch, an electrical circuit for controlling the movements of the diverter arm, and a switch in each conveyor branch for causing closing of said conveyor branch by the diverter arm after a predetermined number of packages has moved into the conveyor branch and has moved out of the path of movement of the diverter arm.

6. In a conveyor system, a conveyor having a junction and two channel conveyors leading therefrom, a roller adjacent to the junction, lifter arms pivoted adjacent to said roller, means for elevating said lifter arms including an electric circuit for controlling said means, a pivoted diverter at the junction beyond the roller and operative to divert packages into one or the other of the channel conveyors after the packages have passed over the roller, a switch in each channel conveyor for causing lowering of the lifter arms after a predetermined number of packages has passed into said channel conveyor, and a switch for causing the diverter to close off said channel conveyor after said predetermined number of packages has passed into said channel conveyor and has moved out of the path of movement of the diverter.

7. In a conveyor system, a conveyor having a junction from which a plurality of branch conveyors extend, a pivoted diverter arm located at said junction, electrically-controlled pneumatic means for moving said diverter arm to cause it to block the passage of packages into one or the other of the branch conveyors, a roller extending transversely of the conveyor and normally operative to prevent the passage of packages past it, lifter arms pivoted adjacent to said roller and operative to elevate packages moved over them and cause said packages to pass over the roller and move into one or the other of the branch conveyors, electrically-controlled pneumatic means for raising said lifter arms to operative position, switch means in each branch conveyor for controlling the operation of the lifter arms whereby said lifter arms will be rendered inoperative after a predetermined number of packages has been moved into a branch conveyor, switch means in each branch conveyor for causing movement of the diverter arm to a position to block said branch conveyor after said predetermined number of packages has entered said branch conveyor, said mentioned switch means being operative to cause movement of said diverter arm only after the packages in said branch conveyor have been moved out of the path of movement of said diverter arm.

8. In a conveyor system, a conveyor having a junction from which a pair of conveyors extend, a movable diverter arm located at said junction, electrically-controlled means for moving said diverter arm to cause it to block the passage into either of the branch conveyors, a roller extending transversely of the conveyor and normally operative to prevent the passage of packages past it, lifter means operative to elevate packages and cause them to pass over the roller, electrically-controlled means for elevating the lifter means, switch means in each of the branch conveyors and operative by the contact of packages with said switch means for controlling the operation of the lifter means whereby said lifter means will be rendered inoperative after a predetermined number of packages has been moved into a branch conveyor, switch means in each branch conveyor operated by packages moved past it for causing movement of the diverter arm to a position to block said passages after a predetermined number of packages has entered said branch conveyor.

CHARLES F. HUTTMANN.

References Cited in the file of this patent
UNITED STATES PATENTS

| Number | Name | Date |
|---|---|---|
| 2,371,419 | Bergmann | Mar. 13, 1945 |